April 10, 1945.　　　J. B. BRENNAN　　　2,373,098
ELECTROSTATIC CONDENSER
Filed April 14, 1941
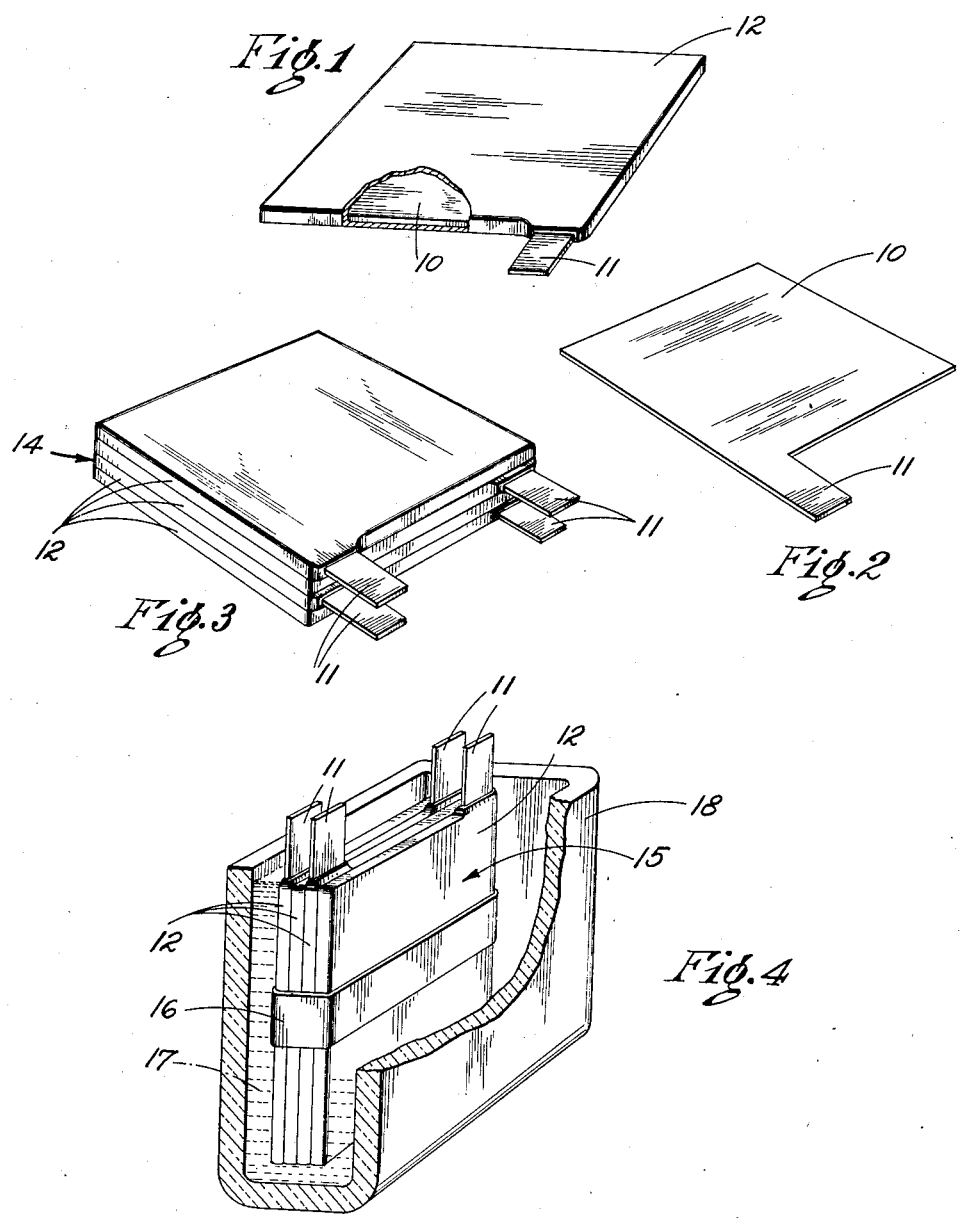
INVENTOR.
JOSEPH B. BRENNAN
BY
Richey & Watts
ATTORNEYS Patented Apr. 10, 1945

2,373,098

UNITED STATES PATENT OFFICE 2,373,098

ELECTROSTATIC CONDENSER

Joseph B. Brennan, Euclid, Ohio

Application April 14, 1941, Serial No. 388,505

3 Claims. (Cl. 175—41)

This invention relates to electric condensers or capacitors and more particularly to electrostatic condensers. This application constitutes a continuation in part of my copending application, Serial No. 213,038, filed June 10, 1938, now Patent No. 2,238,031, issued April 15, 1941.

It is among the objects of my present invention to provide a condenser which can be manufactured at low cost and which will be durable and have high dielectric strength. Another object is to provide a condenser which is resistant to the effects of moisture and which will stand up under severe operating conditions and high voltages. A further object is to provide plates adapted for use in condensers of various types.

Briefly, I attain the foregoing and other objects of my invention by providing a condenser made up of an assembly of plates, each plate preferably consisting of a metallic sheet encased in an individual envelope of vitreous dielectric material fused to the surfaces of plates. Preferably the plates are composed of iron or steel and the dielectric material is porcelain enamel. The plates each are provided with terminal portions projecting beyond the dielectric envelope and the plates may be assembled together to form condensers either with or without the use of an additional dielectric material such as oil.

Referring to the drawing in which a preferred form of my invention is illustrated, in Fig. 1 I have shown a plate made according to my invention, part of the dielectric film or envelope being broken away; Fig. 2 illustrates the metallic plate or armature before it is provided with a dielectric envelope; Fig. 3 shows a plurality of plates such as those illustrated in Fig. 1 assembled together to form a condenser; and Fig. 4 illustrates a similar assembly of plates incorporated in a condenser embodying a liquid such as oil as an additional dielectric material.

As shown in Figs. 1 and 2, a condenser plate made according to a preferred form of my invention may comprise a metallic member 10 constituting the plate proper and having a terminal portion 11 projecting therefrom. The plate, except for the terminal portion, is enclosed in a dielectric envelope indicated at 12 and consisting of porcelain enamel or other vitreous material fused to the plate. Preferably, the plates 18 are formed of very thin sheets of ferrous material such as iron foil or very thin cold rolled low carbon steel. The plates may be provided with the dielectric envelope by separately coating them with frit, i. e., enamel or glass in powder or paste form in accordance with the usual practice of enameling, subjecting the plates so coated to a preliminary drying treatment and then heating the plates to a high temperature to fuse the enamel to the surface of the iron, thus forming a structure in which the plates are sealed within separate envelopes of vitreous dielectric material.

This method produces, in effect, a glass on the surfaces and edges of the plates except for the terminal portions 11. All air or gas pockets are eliminated. The glass or enamel is of high dielectric strength and very thin (the thickness of both the plates and the enamel coatings are greatly exaggerated in the drawings for convenience of illustration) so that the plates can be assembled into a compact condenser, and the vitreous enamel coating protects the plates from damage and corrosion.

As shown in Fig. 3, any desired number of plates may be assembled to form a condenser indicated at 14 merely by stacking the plates one upon the other as shown. The terminal tabs 11 of alternate plates are disposed at opposite sides to provide separated terminal connections for plates of opposite polarity. If desired, the plates may be assembled as shown at 15 in Fig. 4 with a band 16 to hold them together and immersed in oil 17 within a suitable container 18. For some purposes, particularly for high voltage condensers, the additional dielectric is of importance. If desired, the plates may be spaced apart slightly to increase the dielectric strength of the condenser, instead of being held together as shown in the drawing, any suitable spacers of insulating material being employed for this purpose. The enameled plates are of particular advantage in the type of condenser shown in Fig. 4 for the enamel, being a very inert material does not have any tendency to contaminate the dielectric liquid surrounding the plates. Thus, the dielectric strength and purity of the liquid are maintained at their original efficiency for long periods of time. Because the plates are protected by enamel coatings, the presence of slight amounts of moisture in the liquid will not result in any corrosion of the plates, whereas with ordinary unprotected condenser plates this presents a serious problem. Further, the thin, fused, vitreous material is somewhat flexible and will withstand impact so that the plates may be handled and assembled without likelihood of damage as by cracking or flaking off of the enamel. The enamel preferably employed has a coefficient of expansion somewhat near that of the metal, at least to the extent that it will not crack or chip due to changes in temperature encountered in operation.

From the foregoing description of preferred forms of my invention, it will be evident that condensers can be made according to my invention at very low cost from inexpensive materials and simple manufacturing steps. Because of the thinness and strength of the enameled dielectric layers and because the plates can be made very thin, condensers according to my invention can be produced with high capacities in proportion to their size. The plates are protected against corrosion and other damage by the vitreous envelopes and, further, the vitreous coatings prevent the material of the plates from contaminating the oil in case the plates are incorporated in condensers of the oil type. For these reasons, condensers embodying my plates are efficient, sturdy and long lived.

Various changes and modifications in my invention will be apparent to persons skilled in the art. For example, other vitreous dielectric materials may be employed instead of porcelain enamel, different terminal structures may be utilized, the condensers can be made of different sizes and, within reason, any desired number of plates can be stacked together in a condenser, depending upon the capacity desired. Therefore, it is to be understood that these and other changes and modifications are within the teachings of my invention and that my patent is not limited to the preferred forms disclosed herein or in any manner other than by the appended claims when given the range of equivalents to which my patent may be entitled.

I claim:

1. An electrostatic condenser comprising a container, a dielectric liquid in said container, a plurality of separately formed condenser plates immersed in said liquid, each plate consisting of a metallic portion enclosed in an individual envelope of dielectric material bonded to said metallic portion, said dielectric material preventing all contact between said metallic portion and said dielectric liquid.

2. An electrostatic condenser comprising a container, a dielectric oil in said container, a plurality of separately formed condenser plates immersed in said oil, each plate comprising a thin sheet of ferrous material enclosed in an individual envelope of porcelain enamel fused to said sheet and having a terminal portion projecting beyond said envelope, and means for retaining said plates in proper position with respect to each other.

3. An electrostatic condenser comprising a container, a dielectric liquid in said container, a plurality of separately formed condenser plates immersed in said liquid, each plate consisting of a metallic portion enclosed in an individual envelope of vitreous dielectric material bonded to said metallic portion, said vitreous dielectric material preventing all contact between said metallic portion and said dielectric liquid.

JOSEPH B. BRENNAN.